No. 613,203. Patented Oct. 25, 1898.
M. HUTIN & M. LEBLANC.
ALTERNATING CURRENT MOTOR SYSTEM AND METHOD OF OPERATING SAME.
(Application filed Apr. 10, 1897.)
(No Model.) 3 Sheets—Sheet 1.

Witnesses
Inventors,
Maurice Hutin
Maurice Leblanc,
By Joseph Lyons
Attorney.

No. 613,203. Patented Oct. 25, 1898.
M. HUTIN & M. LEBLANC.
ALTERNATING CURRENT MOTOR SYSTEM AND METHOD OF OPERATING SAME.
(Application filed Apr. 10, 1897.)
(No Model.) 3 Sheets—Sheet 2.

No. 613,203. Patented Oct. 25, 1898.
M. HUTIN & M. LEBLANC.
ALTERNATING CURRENT MOTOR SYSTEM AND METHOD OF OPERATING SAME.
(Application filed Apr. 10, 1897.)
(No Model.) 3 Sheets—Sheet 3.

Witnesses
J. H. Hinkel
P. T. Chapman

Inventors,
Maurice Hutin
Maurice Leblanc
By Joseph Lyons
Attorney

UNITED STATES PATENT OFFICE.

MAURICE HUTIN AND MAURICE LEBLANC, OF PARIS, FRANCE, ASSIGNORS TO THE SOCIÉTÉ ANONYME POUR LA TRANSMISSION DE LA FORCE PAR L'ÉLECTRICITÉ, OF SAME PLACE.

ALTERNATING-CURRENT-MOTOR SYSTEM AND METHOD OF OPERATING SAME.

SPECIFICATION forming part of Letters Patent No. 613,203, dated October 25, 1898.

Application filed April 10, 1897. Serial No. 631,627. (No model.) Patented in France September 12, 1896, No. 259,647.

*To all whom it may concern:*

Be it known that we, MAURICE HUTIN and MAURICE LEBLANC, citizens of the Republic of France, and residents of Paris, France, have invented certain new and useful Improvements in Alternating-Current-Motor Systems and Methods of Operating the Same, of which the following is a specification, and for which Letters Patent have been granted in France, dated September 12, 1896, No. 259,647.

It is well known that alternating-current motors, whether of the monophase or polyphase variety, have the defect of requiring a greater amount of apparent power than that which they consume. This defect is especially apparent during variations in the speed of the motor. It is also known that monophase motors have the defect of not being self-starting. Generally speaking, then, our invention has for its object the removal of the defects here pointed out.

Figures 1, 2:
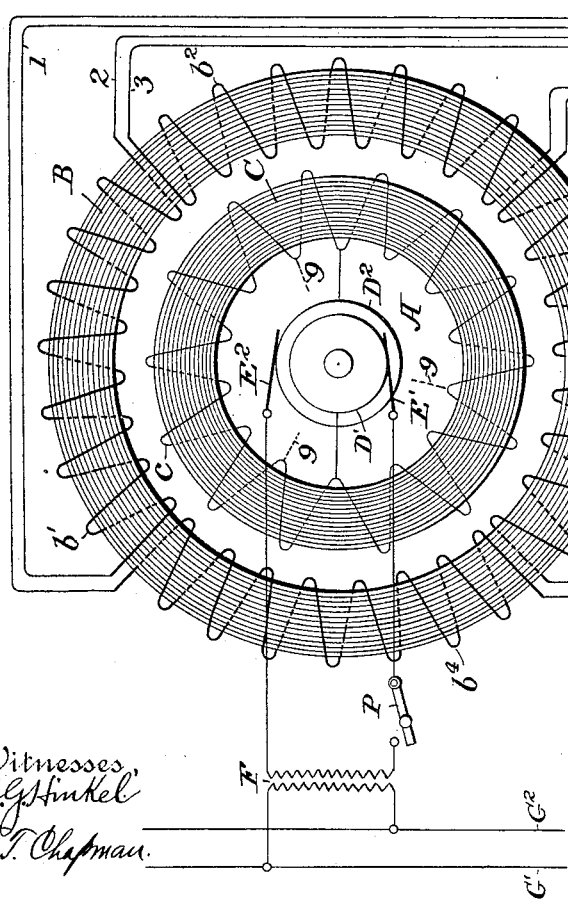
Figure 2:
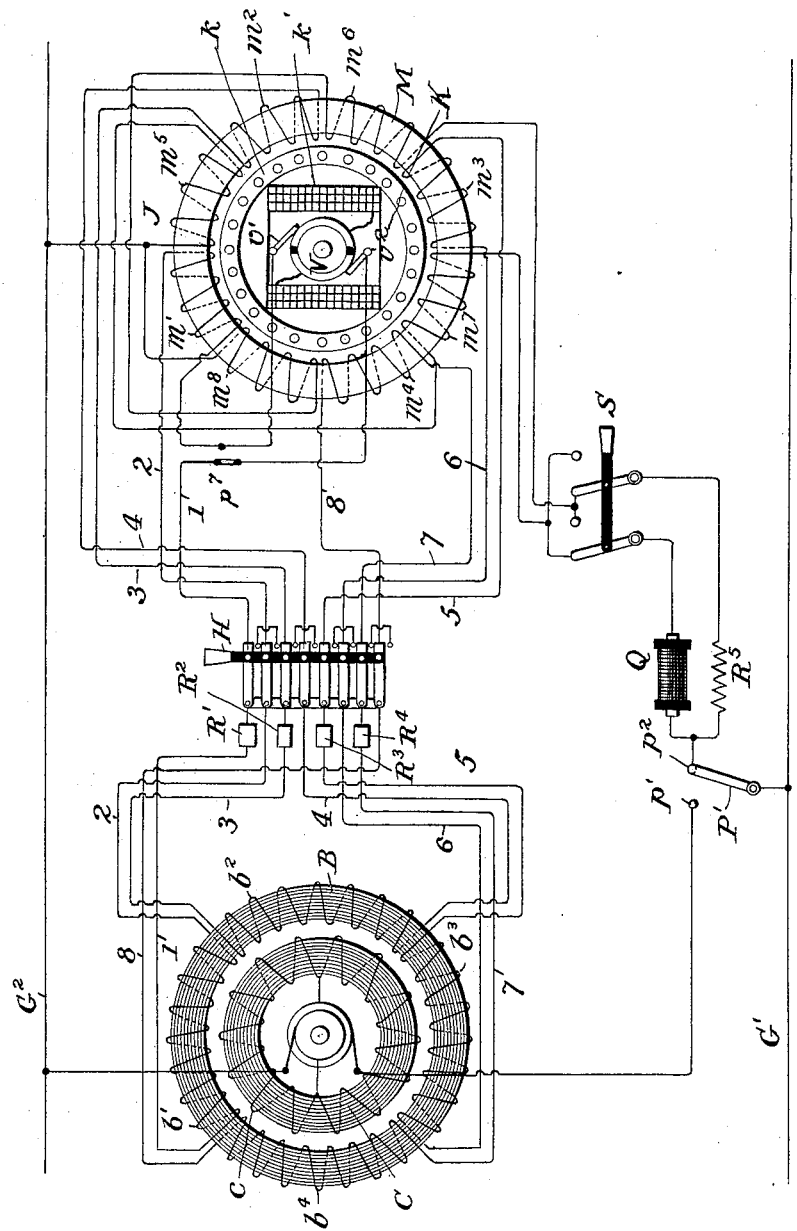
Figure 3:
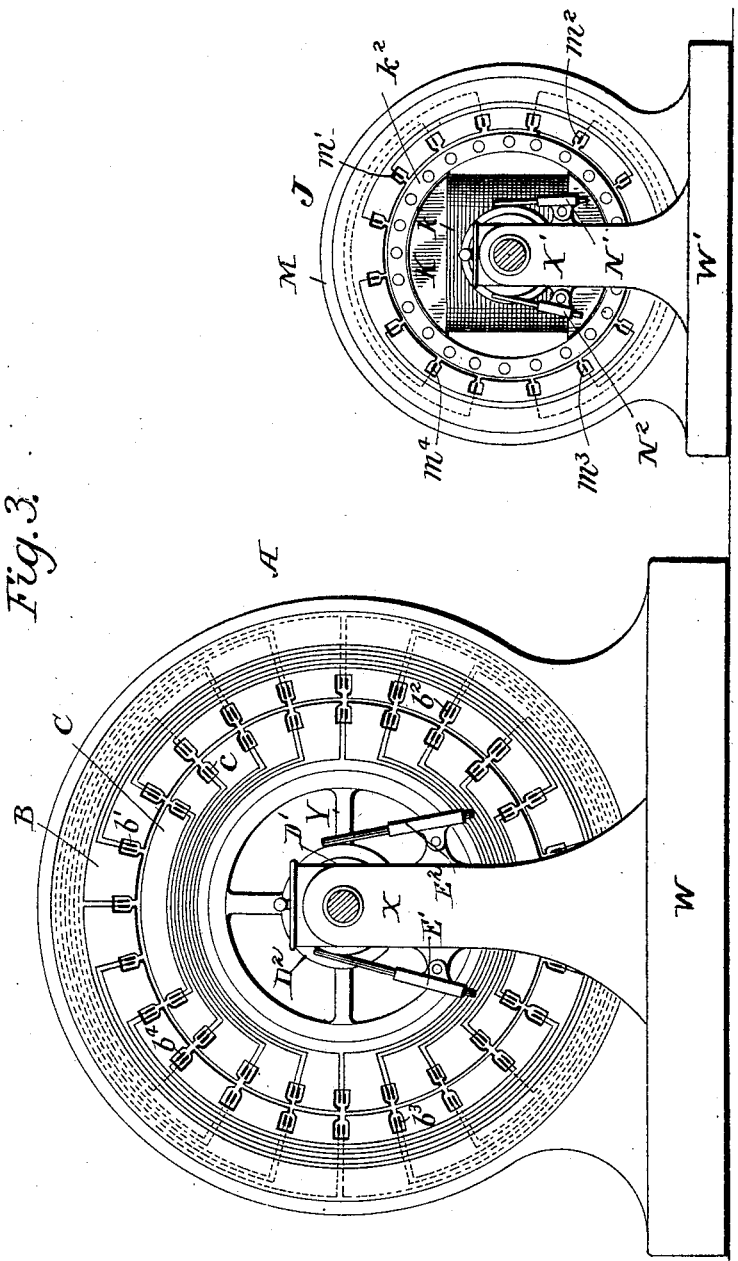

In the drawings attached to this specification, Figure 1 is a diagrammatic view of an alternating-current-motor system arranged according to our invention. Fig. 2 shows a modification of the same. Fig. 3 shows our improved motor system in its preferred form, and Fig. 4 shows a detail of a rheostat.

In Fig. 1, A is an asynchronous monophase induction-motor comprising the induced member B and the inducing member C. We have shown the inducing member as the rotor; but it is well understood that this feature is not essential, but that either or both members may rotate. The inducing member C is shown as wound with a closed-ring winding connected at two diametrically opposite points to rings $D'$ $D^2$, on which bear brushes $E'$ $E^2$, connected through the switch P to the secondary winding of a transformer F, whose primary is fed through the single-phase alternating mains $G'$ $G^2$. This inducing member will evidently be the seat of two alternating poles at diametrically opposite points.

The induced member or stator B has its winding divided into a number of sections or coils, in this case shown as 4. It is evident that when these sections or coils are short-circuited, as they may be by means of the switches H and H', that the machine A becomes a single-phase asynchronous motor of the induction type. Such a motor when monophase will not start itself and tends to take at all times a considerable idle current. The purposes of our invention are to reduce or wipe out the idle current and in the case of monophase motors to produce an automatic means for starting the same from rest. This we accomplish by means of the auxiliary synchronous motor J. This synchronous motor J consists of a direct-current member K and an alternating-current member M. The first is the rotor and the second the stator, though it will be evident that in this, as in other respects, our invention is completely reversible. The rotor K consists of a shuttle-shaped piece of magnetic metal mounted on the shaft of the machine and wound with the direct-current winding $k'$, supplied with current through the brushes $N'$ $N^2$ bearing on rings, as is usual in such machines. The exciting-current for this winding may be taken from the alternating-current system by proper commutation, as will be more fully set forth hereinafter; but in this figure we have shown a small direct-current generator O, connected through a switch $o$ to the brushes $N'$ $N^2$. A rheostat $R^6$ serves to control and vary this direct current.

Outside of the rotor structure and rigidly attached to it we prefer to provide a short-circuited winding $k^2$, which may be of the "squirrel-cage" type, consisting of a number of copper bars connected together by a ring at each end. This structure forms a magnetic screen, whose function will be explained hereinafter.

The ring M of the synchronous motor J is wound with a number of coils corresponding to the number of coils on the induced member B of the asynchronous motor. In the machine which we have illustrated there are four coils $m'$ $m^2$ $m^3$ $m^4$ on the ring M of the synchronous motor J, which coils are connected by the wires 1 2 3 4 5 6 7 8 to the coils $b'$ $b^2$ $b^3$ $b^4$ on the ring B of the asynchronous motor A—that is to say, the corresponding coils on the rings M and B are severally connected in opposition. The switch H is connected to the wires 1 2 to 8 in such a way that in the position shown it closes the circuits formed by those wires through variable resistance R' R² R³ R⁴; but if the switch H is thrown to its other position it will short-circuit the coils $b'\ b^2\ b^3\ b^4$ separately through the adjustable resistances and will open the windings $m'\ m^2\ m^3\ m^4$. Furthermore, the several resistances R' R² R³ R⁴ are each variable and may be increased or decreased simultaneously, so as to throw out all of the resistance or to throw in any amount of resistance up to the maximum by any convenient arrangement connecting the movable member of each separate rheostat. We have shown one such arrangement in Fig. 4 of the drawings, where the common bar H' slides over the several resistances in a manner unnecessary to further explain. If now, with the switch H in the position shown, the switch P be closed, alternating current will flow through the winding c, creating two alternating-poles in the ring C. These poles will induce currents in the windings $b'\ b^2\ b^3\ b^4$, which currents will be carried by the wires 1 2 to 8 to the coils $m'\ m^2\ m^3\ m^4$ on the inducing member or stator of the auxiliary motor J. These currents will not, however, be of such a character as to cause either of the motors to start, and the motor A will therefore simply act as a transformer, taking single-phase current from the line and delivering four single-phase currents to the motor J. The counter electromotive force of each of the coils $m'\ m^2\ m^3\ m^4$ will, under the well-known law, be equal to the electromotive force at the terminals of the corresponding coil $b'\ b^2\ b^3\ b^4$ minus the electromotive force necessary to force current through the circuits, which is used up as ohmic resistance. These counter electromotive forces of the coils $m'\ m^2\ m^3\ m^4$ will be practically in phase with the electromotive forces of the coils $b'\ b^2\ b^3\ b^4$. The effect which the secondary current from the coils $b'\ b^2\ b^3\ b^4$ will produce on the ring M will be to set up a pair of alternating poles at opposite points. The alternating polar line joining these points may, as is well known, be resolved into two polar lines rotating in opposite directions at the rate of one turn for each period of the current supplied. In analyzing the action of of our improved motor system it is convenient to regard the actions from this point of view. These two rotating fluxes will, however, be of small magnitude in the state of affairs under consideration for the reason that they have to pass with considerable relative velocity through the flux-screen $k^2$, which tends to cut down their intensity. Suppose the frequency of the current supplied and therefore the speed or number of rotations per second of the two fluxes be $\frac{1}{T}$. If now we start the rotor K in any manner whatever, so that its speed of rotation is $w$, the field which turns in the same direction as the rotor will have with relation to the flux-screen $k^2$ the speed $\frac{1}{T}-w$, while the second field will have with relation to the flux-screen the speed $\frac{1}{T}+w$. Now it is evident under these circumstances that the rotor of the synchronous motor will tend to run up nearly to synchronism, since that one of the two fields which has the smaller velocity with relation to the flux-screen will be cut down but little by the screen, whereas the field which rotates in the opposite direction to the screen and has therefore a great velocity relative thereto will be cut down a great deal. The field which is moving in the same direction as the screen will thus be effective and will ultimately be the only effective field. This is fully explained in our Patent No. 545,693 of September 3, 1895. The rotor of the synchronous motor will thus attain a nearly synchronous speed. At this point direct current is supplied thereto through the brushes N' N², whereupon the speed of the rotor will at once become synchronous. When synchronism has been attained, the screen will have no effect upon the field which turns in the same direction as itself, since there is no relative or differential velocity between this field and the screen; but the screen will practically obliterate the other field turning in the opposite direction, so that at this point we may regard the ring M of the synchronous motor as the seat of a rotary field of the ordinary type moving with the velocity of the rotor. Furthermore, the flux engendered by the winding $k'$ of the rotor of the synchronous motor, which is substantially in phase with the field in the ring, will superpose itself on that rotary field and can be made to reinforce the action of the same as much as is desired. This rotary field in the ring M of the synchronous motor will evidently cause a progressive variation of the counter electromotive force of the separate coils of the winding $m'\ m^2\ m^3\ m^4$ as we proceed around the ring. This will cause the currents in the wires 1 2 to 8 to become multiphase in character. We shall therefore create in the ring B of the asynchronous motor a corresponding rotary field which will rotate, the connections being as shown, in the same direction and with the same speed as the field in the auxiliary motor J. The point to be observed is that the intensity of this field in the main or asynchronous motor A depends upon the intensity of the field developed in the auxiliary motor M and grows with the magnetizing force of the winding $k'$, so that the inductor C of the asynchronous motor is not required to furnish what might be called "idle" or "wattless" currents for the development of this field. It is seen, therefore, that we not only generate in the asynchronous motor a powerful field which fits the motor to start under load, but that this field may be entirely derived from the energy of the continuous current which traverses the winding $k'$ of the synchronous motor. By this arrangement the intensity of the idle or wattless currents which the line is obliged to furnish to the asynchronous motor may be made zero or even negative, and this even at the moment of starting. The motor A being influenced by a rotary field impressed upon it by action of the synchronous motor will now start under load. The action of the auxiliary synchronous motor J, if properly proportioned, is thus to advance the phase of the currents in the wires 1 2 to 8 and to excite the field of the asynchronous motor in a manner to neutralize the effect of the self-induction, so that even when starting under full load the motor A has to take little or no idle current from the line. Assuming now that the asynchronous motor A has started and has required a velocity of rotation $\Omega$, it is readily understand that a field which moves with a speed $\frac{1}{T}$ with reference to its inductor C has a velocity of only $\frac{1}{T}-\Omega$ with reference to its induced circuits B. These induced circuits are therefore the seats of current which, as we have before seen, correspond to a rotary field and which, as we now see, have a frequency of $\frac{1}{T}-\Omega$. Since, however, the speed of rotation of the effective field in the auxiliary synchronous motor is equal to the speed of rotation of the field in the asynchronous motor, as we have before explained, it follows that the field in the auxiliary synchronous motor will rotate with a velocity of $\frac{1}{T}-\Omega$. The rotor of the synchronous motor manifestly moves at the same rate of speed. It follows, therefore, that as the speed of the rotor of the asynchronous motor gradually increases the speed $\frac{1}{T}-\Omega$ of the rotor of the synchronous motor gradually decreases, the sums of these two speeds $\frac{1}{T}$ being substantially constant. When the rotor of the asynchronous motor has reached its normal speed, which with a frequency of forty periods per second would be from thirty-eight to thirty-nine revolutions, the auxiliary asynchronous motor will turn over very slowly at the rate of from one to two revolutions per second. It will be seen from this relation which exists between the speeds of the rotary members of the main and auxiliary motors that the auxiliary motor has only to turn at its maximum speed during the short period of starting the main motor. Normally it is running at a very slow speed. We can thus make the auxiliary motor of relatively small dimensions as compared with the dimensions of the main motor. We can furthermore permit the auxiliary motor to take during the short period of starting the main motor a high speed of rotation which would be inadmissible by reason of the heating of the parts if it had to be maintained for a long time. We may likewise permit high values of flux density in the iron masses of this auxiliary motor which would not otherwise be possible.

In order to assist the understanding, we proceed to give in somewhat general language an account of the main features of the construction and operation of the system in so far as they have been specifically described in the preceding part of this specification. We have started with a motor which, as shown, is of the asynchronous monophase type. The induced windings of this motor have been divided into sections and connected to the corresponding winding of an auxiliary synchronous motor. This synchronous motor has a magnetic screen or some other means of suppressing a magnetic flux, moving in a direction opposite to that of its rotor, and it has also a means for supplying a direct current thereto. Both the main and auxiliary motors being at rest, we find that the induced coils of each motor may each be considered as the seat of two fields rotating in opposite directions at equal speed. This will not start either motor. If, however, the rotor of the small auxiliary synchronous motor be given a start, however small, the action of the magnetic screen will tend to obliterate the field rotating in the opposite direction to it, so that the field rotating in the same direction as the rotor just started will be effective to increase the speed of the rotor and to bring it nearly up to synchronism. At this point direct current is turned into the synchronous motor which then runs at synchronism with its field.

The rotary field in the synchronous motor, through the connections of the sectional windings on the two motors, produces a rotary field in the asynchronous motor, which two fields rotate with equal velocities. The energy of this rotating field in the asynchronous motor is in reality supplied from the direct current which is fed into the synchronous motor and need not be supplied in the shape of idle current from the inducing member of the asynchronous motor. The rotary field in the asynchronous motor will start its rotor. As the speed of the rotor of the asynchronous motor increases, the speed of the rotor of the synchronous motor decreases. The speed of the rotor of the synchronous motor equals the speed of rotation of the field of the synchronous motor, which in turn equals the speed of rotation of the field of the asynchronous motor. The sum of the velocities of rotation of the rotors of the asynchronous and synchronous motors is constant. It follows then that by the small start which we have given to the rotor of the small auxiliary synchronous motor the rotor of that motor has automatically run up to synchronism, and has then in turn served to start the rotor of the main machine. Furthermore, there has been no waste of energy in the windings of this main machine by idle currents. After the system has once been started by the initial impulse given to the rotor of the synchronous motor the speed of rotation of the asynchronous member may vary to any extent without requiring a new start for the synchronous motor. It merely happens that when the speed of the asynchronous motor decreases the speed of the synchronous motor correspondingly increases in readiness to bring the asynchronous motor up to its normal speed. During all of this time, too, it is repeated that the energy of the rotating field of the asynchronous motor is practically supplied by the direct current from the synchronous motor, so that there is no waste of energy by idle currents in the asynchronous motor, which means that the effect of the self-induction in the asynchronous motor has been neutralized.

We have thus far confined our description to motors of the monophase type. It is quite evident, however, that we may use motors of any multiphase type, and we have shown by the dotted lines 9 9 9 in Fig. 1 how such multiphase currents might be used. In the case of multiphase motors all that we have said with relation to monophase motors about energizing their fields and neutralizing their apparent self-induction applies with full force. The auxiliary synchronous motor, however, being multiphase will now become self-starting by reason of the multiphase currents, so that the magnetic screen for starting purposes is no longer necessary. It is, however, still valuable in assuring the speeding up of the rotor and in maintaining the synchronous running of the auxiliary rotor.

We now come to the use of the variable resistances $R'$ $R^2$ $R^3$ $R^4$, controlled by the switch $H'$. It will be understood from the operation of the system as it has thus far been described that we have here to do, first, with the system when all parts are at rest and the rotor of the synchronous motor is about to be started, and, second, with the system when the rotor of the synchronous motor is moving at its proper speed, but the rotor of the asynchronous motor has either stopped or is moving at a very slow speed—that is to say, we are here concerned, first, with the period of starting the entire system by starting the synchronous motor, and, second, with the periods of starting and stopping the asynchronous motor when the system as a whole is in operation by reason of the fact that the rotor of the synchronous motor is moving at its proper speed. Taking the first of these cases, when the system as a whole is at rest and the auxiliary synchronous motor is about to be started, it is plain, since there are present no means to cut down the initial rush of current except those due to ohmic resistances and stray magnetic lines of force of the asynchronous and synchronous motors, that the current furnished by the line to the inductive circuit of the asynchronous motor would acquire at this instant a very great intensity, which would not only be dangerous to the apparatus, but would bring about a drop of potential on the line. We avoid this inconvenience by the use of the variable resistances shown in Fig. 4, which, as shown in Fig. 1, are placed in the different circuits constituted by the union of the induced circuits of the asynchronous motor and the circuits of the armature of the synchronous motor. Assuming both the synchronous and asynchronous motors to be at rest, we move the switch $H'$, so as to throw all the available resistances into the circuit. Only after this has been done do we throw current into the inductor of the asynchronous motor by turning the switch P. These resistances thus cut down the rush of current at the start. After the synchronous motor has been run up to speed these resistances may be cut out.

Suppose now, coming to the second case, that we desire to start and stop the asynchronous motor without stopping the synchronous motor—that is to say, without putting out of operation the system constituted by these two motors. For this purpose it is sufficient to arrest the asynchronous motor by reinserting the variable resistances $R'$ $R^2$ $R^3$ $R^4$, which will oppose the passage of current in the induced windings necessary for the production of an appreciable motor-couple in the asynchronous motor, but will, on the other hand, permit the passage of the feeble watt-currents necessary for maintaining the rotation of the small synchronous motor. This synchronous motor, even with the resistances in circuit, will have its speed increased in the same measure as the asynchronous motor slows down, for the reasons that its speed of rotation depends upon the frequency of the current and not upon the strength of the current. The synchronous motor will therefore be in condition at all times to insure a new starting of the asynchronous motor. At this period, when the variable resistances have all been put into circuit and the asynchronous motor has stopped, but the synchronous motor is still running, we may also throw open the switch O in the direct-current winding of the synchronous motor, which will then run with considerable slip—that is to say, it will run at less velocity than would otherwise be required. We may at any moment, however, close the direct-current winding to bring the auxiliary motor up to synchronism and then cut out the resistances $R'$ $R^2$ $R^3$ $R^4$ to start the main motor.

When the system is initially put into operation and the motors are monophase, we may avoid the necessity of starting the auxiliary motor by hand by using any old type of starting devices for monophase motors, or we may use the form of starting device shown in Fig. 2. In this figure we have shown the machines connected directly to the mains G' G² without the interposition of the transformer F. It will be obvious that we may use transformers or not, as may be found best in particular installations. From the main G' a wire leads to a two-way switch P', having two contact-points $p'$ $p^2$. From the contact $p'$ a wire leads through the primary member of the motor A to the main G². The connection and construction of the motors in this figure are very similar to those shown in Fig. 1 and the few differences which exist will be pointed out in detail. The switch P' is shown on the contact $p^2$, which corresponds to the starting position. From this contact-point wires lead to the resistance R⁵ and the self-induction coil Q and thence through the reversing-switch S to the supplemental or starting coil $m^5$ $m^6$ $m^7$ $m^8$ on the alternating-current member of the motor J and to the main G. Two of these supplemental coils $m^6$ $m^8$ are in series with the resistance R⁵, and two of the coils $m^5$ $m^7$ are in series with the self-induction coil Q. The pair of coils $m^6$ $m^8$ is in multiple with the pair of coils $m^5$ $m^7$. The action of the self-induction coil Q and resistance R⁵ is to displace the phase of the currents in their respective circuits. As is well known, the result will be to set up a rotary field in the ring M. This rotary field reacting on the winding $k'$ of the rotor K of the synchronous motor, which winding may be short-circuited by means of the switch $p^7$, will cause the rotor to start and to nearly attain a synchronous speed. At this point direct current may be thrown into the winding $k'$ by opening the switch $p^7$ in a manner which will be hereinafter explained. The rotor of the synchronous motor will then run at synchronism, whereupon the switch P' may be thrown to the point $p'$. The asynchronous motor A will now be supplied with current, and the action of the system constituted by the synchronous and asynchronous motors will be the same as that above described for Fig. 1.

We have now to explain the action of the switch $p^7$ in sending direct current into the winding $k'$ of the rotor of the synchronous motor. As shown in the drawings of Fig. 2, we connect the ends of the coil $k'$ to the sections of the commutator V secured to the rotor-shaft of the synchronous motor. On this commutator run brushes $v'$ $v^2$. The brush $v'$ is connected to the winding $m'$ and wire 2 and the brush $v^2$ is connected to the wire 1. We recall also that the speed of rotation of the field in the ring M is equal to the speed of rotation of the rotor K, as has been fully explained. Since, therefore, the current in the wires 1 2 is in phase with the rotation of the rotor K, it follows that the alternating current in the wires 1 and 2 will be redressed into a continuous current in the coil $k'$. It is manifestly desirable in using this arrangement to wind the coil $k'$ with coarse wire in order not to interpolate too large a resistance in the circuit $m'$.

The figures thus far described illustrate the principles of our invention applied to machines of a simple ring type. In practice we prefer to use other forms of armatures and field-magnets, and the preferred structure is shown in Fig. 3. In this figure, A is the main motor, and J is the auxiliary motor, as before. The main motor A is formed with a bed-plate W, supporting bearings X, which in turn support the shaft of the machine. A spider Y serves to secure the inducing member C to the shaft. This inducing member is made up of a number of stamped plates or laminæ, as is usual in such machines, and is provided with a number of slots in its face, in which are wound the inducing coils or windings $c$, so arranged in this case as to produce poles in the iron at diametrically opposite points. Current is supplied to this winding through the brushes E' and E² and the rings D' and D². The induced member B is supported from the base-plate and is also formed of a number of stamped plates with slots for the four windings $b'$ $b^2$ $b^3$ $b^4$, which are displaced, respectively, ninety degrees from each other. The auxiliary motor J comprises a base-plate W' and bearings X', with a rotor and stator whose electrical connections may be as shown in Fig. 1 or as shown in Fig. 2. We have illustrated in this figure a structure especially adapted for the connections shown in Fig. 1. The rotor consists of the shuttle-shaped field-magnet K, wound with the direct-current coil $k'$ and supplied with current through the brushes N' N², bearing on rings, as shown. Outside of this shuttle-shaped field and rigidly attached to it is the squirrel-cage winding $k^2$. The alternating-current member M is similar to the inducing member B of the motor A; but the windings $m'$ $m^2$ $m^3$ $m^4$ should contain a smaller number of turns than the windings $b'$ $b^2$ $b^3$ $b^4$, though this is not an essential feature. The action of this system is the same as that of the system shown in Fig. 1 and need not be set forth here, as this figure merely shows the preferred mechanical construction and is not intended to cover the electrical actions, which have been fully explained above.

Though we have illustrated and described our invention as applied to motors in which there is only one resultant polar line, and though we have shown the same number of poles on the motors A and J, it will be obvious that these are matters which may be varied to suit particular cases; nor do we in any way restrict ourselves to the particular forms and uses shown and described, as it is obvious that they may be greatly varied without departing from the spirit of our invention.

We claim as our invention and desire to secure by Letters Patent—

1. The method of starting a single-phase alternating-current motor of the induction type which consists in opposing progressively-varying electromotive forces to the electromotive forces existing in the circuits of the windings of its induced member so as to create therein a rotary field, substantially as described.

2. The method of starting a single-phase alternating-current motor from rest under load which consists in supplying multiphase electromotive forces to the circuits of its induced windings from an external source.

3. The method of starting and operating a single-phase asynchronous alternating-current motor under load, which consists in charging one of its elements with single-phase currents from the line and producing a rotary field in its other element by the currents derived from a synchronous motor, substantially as described.

4. The method of starting and operating a single-phase induction-motor under load, which consists in charging its primary circuit with single-phase current from a line of distribution and its secondary circuit with multiphase currents from a synchronous machine receiving its excitation from the same line, substantially as described.

5. The combination of an asynchronous single-phase alternating-current motor having induced windings in sections and an auxiliary synchronous machine having windings in corresponding sections connected therewith whereby the single-phase asynchronous motor may be started, substantially as described.

6. The combination of a single-phase alternating-current motor with an auxiliary synchronous machine so connected therewith that the sum of the velocities of their rotors is constant, whereby the single-phase motor may be started under load by the auxiliary motor, substantially as described.

7. The combination of a single-phase motor of the induction type and means external to the machine for impressing multiphase electromotive forces on its induced winding for starting the same, substantially as described.

8. The combination of an asynchronous alternating-current motor, having induced windings in sections and a synchronous machine having windings in corresponding sections connected therewith, the arrangement being such that the excitation of the asynchronous field is supplied by the synchronous machine.

9. The combination of an asynchronous motor having induced windings and a synchronous machine connected with these windings, the sum of the velocities of the two moving parts of the two motors remaining substantially constant for the purpose described.

10. The combination of a single-phase alternating-current motor having induced windings of an auxiliary synchronous machine connected with these windings and acting to set up multiphase electromotive forces therein, the energy of these electromotive forces being derived from the constant source which energizes the synchronous machine, substantially as described.

11. The combination of an alternating-current motor having sectional induced windings and a synchronous motor connected with these sectional windings to set up multiphase electromotive forces therein.

12. The combination of an alternating-current motor having induced windings and a synchronous motor connected to the induced windings with current-varying devices in the connected circuits of said windings, substantially as described.

13. The combination of a main alternating-current motor having induced windings in sections and an auxiliary alternating-current motor having circuits in corresponding sections connected therewith, whereby multiphase electromotive forces are set up in the induced windings of the main motor, substantially as described.

In testimony whereof we have signed our names to this specification in the presence of two subscribing witnesses.

MAURICE HUTIN.
MAURICE LEBLANC.

Witnesses:
HENRY J. WEHLE,
FRED. P. WARREN.